United States Patent [19]
Veatch

[11] Patent Number: 5,775,997
[45] Date of Patent: Jul. 7, 1998

[54] BIG BALL VIDEO GAME CONSOLE

[76] Inventor: Steven Veatch, P.O. Box 307, Eldon, Mo. 65026

[21] Appl. No.: 768,641

[22] Filed: Dec. 18, 1996

[51] Int. Cl.$^6$ ............................................. A63F 9/24
[52] U.S. Cl. ............................................. 463/46
[58] Field of Search .................. 463/46; 273/148 B;
312/223.2, 223.3; 472/130, 60; D6/407,
441, 442; D21/13

[56] References Cited

U.S. PATENT DOCUMENTS

D. 262,723  1/1982  Dweeb ............................ D21/13
4,856,771  8/1989  Nelson et al. ..................... 472/130

Primary Examiner—Jessica Harrison
Assistant Examiner—Michael O'Neill
Attorney, Agent, or Firm—Richard J. Grundstrom

[57] ABSTRACT

A big ball that serves as a video game console. The ball has internal shelving for holding one or more video games. The shelving will hold a monitor or a number of monitors so they displayed through opening in the big ball. A computer for a computer based video game will also be contained on the shelving within the big ball. A game playing device, such as a joy stick or steering wheel, will be attached to and extend from the big ball under the opening displaying the monitor. A tower may be used to mount the playing device at the proper height and angle for convenient playing of the game. A monetary receiver can be included for initiating the game. A ticket dispenser can also be included for giving a specific number of tickets corresponding to the score achieved in the game.

16 Claims, 2 Drawing Sheets

BIG BALL VIDEO GAME CONSOLE

BACKGROUND OF THE INVENTION

The present invention relates to a big ball video game console and more particularly to a type of console holding one or more video games within a big ball.

Video games are a very popular form of entertainment, especially among the young. Video arcades and amusement centers typically have several different type of games and game configurations. Each has there own appeal to the players. Since amusement centers and video arcades are in business of making a profit, the games need to attract the attention of the potential player.

There are the typical game consoles made up of a cabinet with squared-off angles. These can come in a variety of sizes and are typically painted or covered with decals representing some imaginative form of the game. They are painted and covered with decals to attract attention to the game. The games themselves may not be all that different, software wise. Visual displays during the game can be the only difference in some cases. The attraction often is based upon the visual appeal created by the sight of the cabinet and the sounds created by the game.

Typically, the cabinets of the video game are adapted for a single game. The game within cannot be changed unless the exterior of the cabinet is also changed. This results in a costly endeavor for the owner. Therefore, exchanging games from one arcade to another often occurs. With this invention multiple games can be installed so multiple persons can play at a single console simultaneously. Additionally, the games within can be changed within as desired without the need to change the exterior.

There are always new ways being created to attract attention to games. This invention relates to attracting attention of players in the mist of a video arcade or amusement center. A game that stands out from the rest and has visual appeal, will attract both new and old players and will be profitable for the owner.

Accordingly, it is an object of the present invention to provide a big ball video game console adapted to provide a unique console that can be used with a single video game or with a plurality of video games. With this invention there can be a single video game for play by a single individual or there can be a plurality of video games with independent play. The games do not have to be related. Each game within would typically be independent from the others.

Another object of the present invention is to provide an improved big ball video game console constructed to provide an exterior that is unique on its own without the need of painting the exterior or covering with decals. The big ball video game console is unique enough that it stands out and attracts attention.

A further object of the present invention is to provide a big ball video game console adapted for incorporation of a variety of different games that can be easily changed without the need of extensive changes to the exterior and to eliminate the need of video game exchanges between arcades.

Still another object of the present invention is to provide a big ball video game console that may be easily constructed, yet provide a sturdy and attractive console, which can be afforded by the consumer of such gaming devices.

SUMMARY OF THE INVENTION

To accomplish the foregoing and other objects of this invention there is provided a big ball video game console. The big ball video game console of this invention includes a big ball with internal shelving for holding a single or a plurality of video games. The shelving will hold the monitor, or a plurality of monitors, in such a manner that each will be displayed through openings in the big ball. A computer, and power supply, for the computer based video game will also be contained on the shelving within the big ball. A game playing device, such as a joy stick or steering wheel, will extend from the big ball under the opening displaying the monitor. A monetary receiver can be included for initiating the game. A ticket dispenser can also be included for giving a specific number of tickets corresponding to the score achieved in the game.

These and other objects and features of the present invention will be better understood and appreciated from the following detailed description of the main embodiment thereof, selected for purposes of illustration and shown in the accompanying drawings.

DETAILED DESCRIPTION

Figure 1:
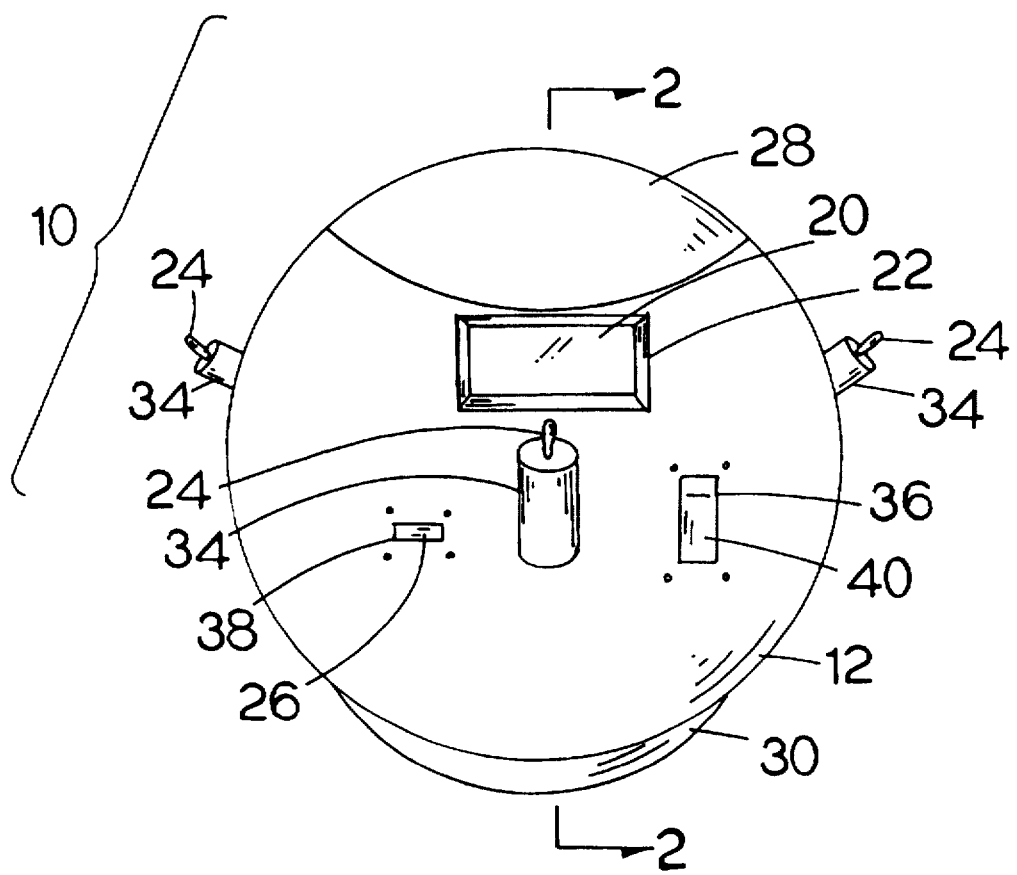
FIG. 1 is a view showing the big ball video game console of this invention.
Figure 2:
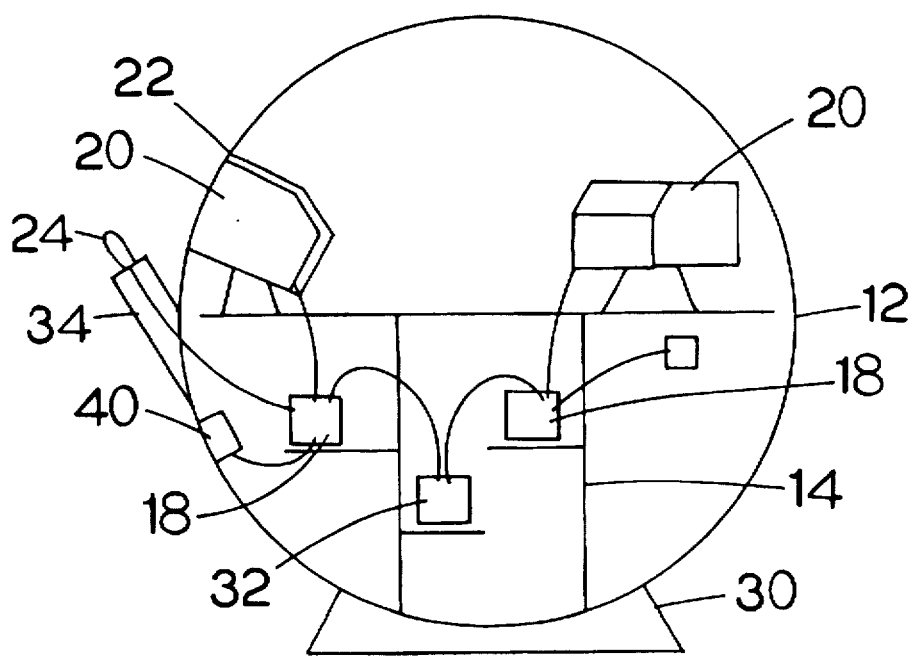
FIG. 2 is a sectional view of the big ball video game console as shown in FIG. 1.
Figure 3:
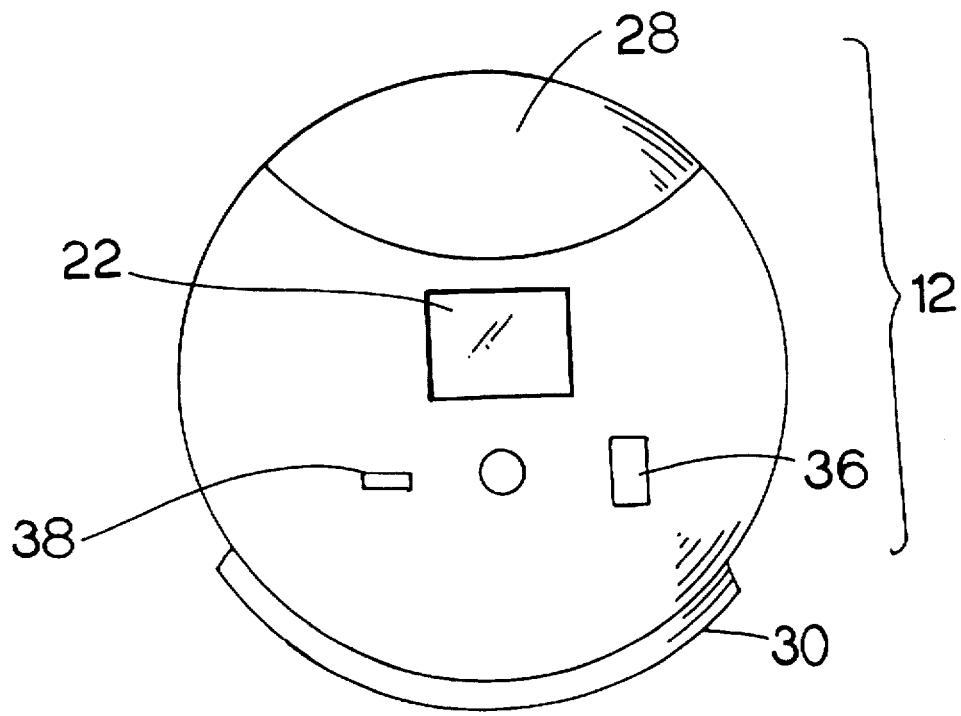
FIG. 3 is a view showing the ball, the various opening that may be contained on the ball and the removable section.

Referring now to the drawings there is shown the preferred embodiment for the big ball video game console 10 of this invention.

The big ball video console 10 of this invention generally consists of a big ball 12 having shelving 14 within the ball 12 for holding one or a plurality of video games 16. Each of the video games 16 will have a computer 18 and a monitor 20. The shelving 14 will hold each monitor 20 such that they can be displayed through an opening 22 in the big ball 12. The computer 18 for each computer based video game 16 will be contained within the big ball 12 on the shelving 14. A game playing device 24, such as a joy stick or steering wheel, will extend from the big ball 12 under the opening 22 displaying the monitor 20. A monetary receiver 40 can be included for initiating the video game 16. A ticket dispenser 26 can also be included for giving a specific number of tickets corresponding to the score achieved in the game. The tickets are then exchanged for a prize when the player has completed all of his playing.

The preferred embodiment and the best mode contemplated of the big ball video game console 10 of the present invention are herein described. However, it should be understood that the best mode for carrying out the invention hereinafter described is offered by way of illustration and not by the way of limitation. It is intended that the scope of the invention include all modifications that incorporate its principle design features.

The principle appeal to the big ball video game console 10 is the big ball 12 that contains the video game 12. The big ball video game console 10 of this invention is designed for placement in an amusement centers. Therefore, the bigger the appeal, the more income can be expected and generated from the game.

The big ball 12 is basically a big hollow spherical ball. The diameter varies depending on the desired use, location and number of video games 16 contained therein. The ball 12 typically has a diameter ranging from approximately three feet to six feet. However, it could be more or less. Typically, the ball 12 will be made of plastic, but other suitable materials could also be used. Since one of the purposes of the big ball video game console 10 is to attract attention and to appeal to many different players, the big ball 12 can be any color in the rainbow. Initial prototypes are blue and are very attractive, but other colors may prove to be more appealing.

The big ball video game console 10 will have at least one video game 16. In the preferred embodiment, there will be three video games 16 contained within the big ball 12. However, there could be more or less depending on the size of the ball 12, the particular location and expected customer volume.

There will be an opening 22 through ball 12 for each video game 16 contained therein. The opening 22 will generally be rectangular in shape. Specifically, the shape will correspond to the specific monitor 20 being used with the video game 16. The opening 22 will be located at a convenient height for viewing of the monitor 20 by the player of the game.

A removable section 28 for access into the hollow spherical ball 12 may also be included. The removable section 28 will usually be located at one side of the ball 12, or along the top area of the ball 12. However, having a removable section 28 and the location of the removable section 28 is optional depending on the particular configuration. Smaller balls 12 having only one video game 16 may only have an opening in the bottom. This opening would be placed over the base 30 and would not be seen. While larger balls 12 having a plurality of video games 16 will contain the removable section 28. Access through the removable section 28 would be for the placement, removal, setup and repair of the video games 16. The removable section 28 will generally be lockable to prevent unauthorized access and it may be hinged if desired.

The ball 12 by itself is round and tends to roll. A base 30 is used to prevent the ball 12 from rolling and holding the ball 12 in a stationary position. The base 30 is generally a large ring that sits upon the floor and the ball 12 rests therein. The base 30 may or may not be permanently attached. If attached, gluing or plastic welding is the preferred method of attaching the base 30 to the ball 12. Brackets with nuts and bolts are also used in some instances. The perimeter area of the ball 12 contained within the base 30 may be open or closed. If open, the ball 12 may be placed over the shelving 14 onto the base 30. If closed, all shelving 14 and the video game 16 would be placed through the removable section 28.

The shelving 14 contained within the ball 12 is typical shelving made from metal brackets and wood pieces. The shelving components are specifically arranged and sized for holding the monitor 20 in front of the opening 22, the computer 18 and a power supply 32 as required, all within the ball 12. The shelving 14 will hold at least one computer 16 for a computer based video game and at least one monitor 20. The specific arrangement will be dependent upon the application. The shelving 14 as shown in the figures is only a representation. It not expected that the scope of the shelving be determined from the figures as shown. Any variation of shelving that produces the same results may be used without departing from the scope, spirit and intent of the invention. The scope shall be determined by the claims and not the figures.

Every video game 16 has to have a playing device 24 of some sort for interacting with the game. The playing device 24 can be a joy stick, steering wheel, keyboard or any other peripheral device used for playing the game. The playing device 24 is attached to the ball 12 in front of the opening 22. This places the playing device 24 at a convenient location for viewing the monitor 20 while playing the game.

A tower 34 may be used for attaching the playing device 24 and placing the playing device 24 at a convenient height and angle for convenient playing of the game. The tower 34 will typically be made from a suitable sized plastic pipe and plastic caps. The tower 34 can be attached by cement, plastic welding, brackets with nuts and bolts or in any combination.

Figure 4:
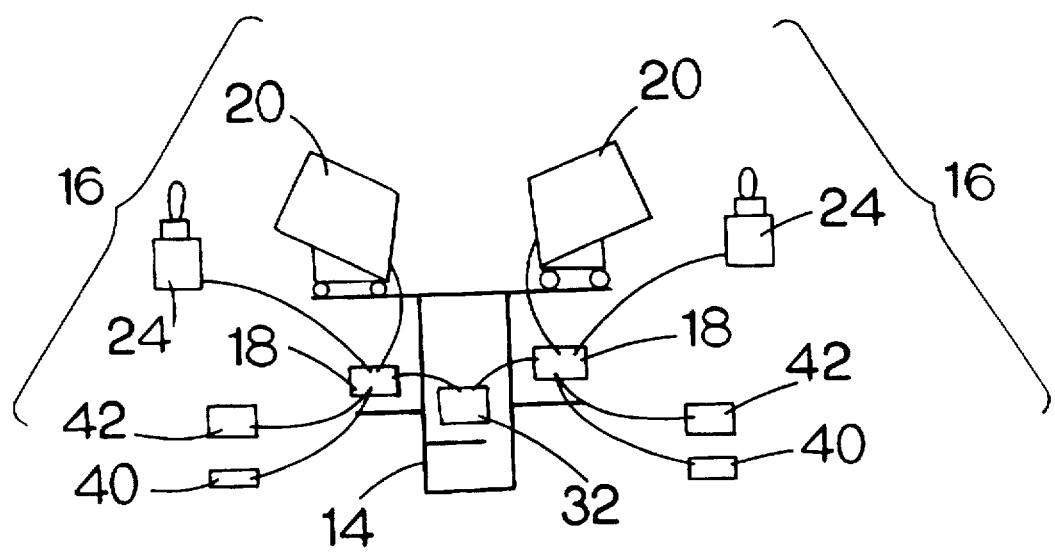
FIG. 4 is a representation of shelving holding the video game.

A monetary receiver 40 for game initiation may also be used. This provides a means for the players to pay for playing the game. If a monetary receiver 40 is not used, there will be some other initiation means 42 for starting the game. This could be a button on the playing device 24 or a separate electrical switch or button contained on or within the ball 12. The separate initiation means 42 is generally referenced on FIG. 4. The specific location is dependent on the application and is not specifically illustrated. The separate initiation means 42 could also be used in parallel with the monetary receiver 40. This feature would generally be provided for the owner to initiate the game without having to insert a monetary instrument. This could be for repair, testing or general play.

Since the principle purpose is for use in amusement centers and video arcades, the monetary receiver 40 will be included in the preferred embodiment. The monetary receiver 40 may be adapted to accept any monetary instrument or combinations thereof, such as coins, tokens, bills, credit cards, or a specific card purchased for playing games within a particular establishment. The principle idea being that the player has to pay to play. The exact means of payment is not determined by the scope of this invention. It is only an embodiment that a monetary receiver 40 for receiving a monetary value be included.

The monetary receiver 40 is mounted within the ball 12 so that a face of the monetary receiver 40, having the slot for receipt of the monetary instrument, is extending through the peripheral surface of the ball 12 near the opening 22. Typically each of the video games 16 will have its own monetary receiver 40. A second opening 36 through the ball will be provided. The face of the monetary receiver will typically be mounted flush with the outer surface of the ball 12.

Some amusement centers and video arcades use tickets as a means of awarding the players. All of the various games within the center or arcade will dispense a number of tickets in accordance with the score achieved in the game. When the player has completed his playing for the day, he can exchange the accumulated tickets for a prize.

In this regard, a ticket dispenser 26 will also be included. The ticket dispenser 26 will be mounted inside the ball 12, with the tickets being ejected through a third opening 38 through the ball 12. The ticket dispenser 26 can be shared between all the video games 16 contained within the ball 12 or each video game 16 could have its own. Again, the particular configuration and purpose will govern the exact setup.

The video game 16 and its computer 18 and monitor 20, the monetary receiver 40 and the ticket dispenser 26 are generally standard within the gaming industry and are not specifically described herein. A power supply 32 may also be needed for some applications. This would also be contained on the shelving 14. A power cord would have to be supplied to provide electrical power necessary for the equipment.

Most games use standard electrical connections and these are not shown on the drawings nor further described herein. Additional cabling would of course have to be included for communication between the various components, such as the computer 18, monitor 20, game playing device 24, ticket dispenser 26 and monetary receiver 40.

Any game or games could be used within the big ball video game console 10 of this invention. The games could also be changed as often as the owner desires. There would be no changes to the exterior of the ball 12 when such changes are made. As the interest in one game diminishes, another game could be installed. Typically, a game is installed by way of disks or cartridges. This is done solely at the discretion of the owner.

A simple sign will usually be included with the big ball video game console 10 to identify the game contained within. This would be a simple sign, that is not illustrated or described any further herein. The sign can be easily moved and changed as desired without any changes made to the ball 12.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A big ball video game console comprising:

a hollow ball, having at least one opening therethrough, a base upon which said ball sits, said base holding said ball in a stationary position, shelving contained within said ball, said shelving holding at least one computer for a computer based video game and at least one monitor, said shelving holding said monitor in front of said opening through said ball, an initiation means electrically attached to said computer for initiation of said computer based video game, and a game playing device attached to the outside of said ball under said opening, said game playing device used to play said computer based video game contained within said ball.

2. The big ball video game console as set forth in claim 1 further comprising a monetary receiver for game initiation, said monetary receiver being mounted within said ball in such a manner that a face of said monetary receiver, having a slot for insertion of a monetary instrument, is extending through a second opening of said ball.

3. The big ball video game console as set forth in claim 2 in which said face of said monetary receiver is flush with an outer surface of said ball.

4. The big ball video game console as set forth in claim 1 further comprising a ticket dispenser, said ticket dispenser being mounted inside of said ball, with tickets from said ticket dispenser being ejected through a third opening through said ball.

5. The big ball video game console as set forth in claim 1 in which said ball further comprises a removable section for access into said ball.

6. The big ball video game console as set forth in claim 5 in which said removable section is lockable to prevent unauthorized access into said ball.

7. The big ball video console as set forth in claim 1 in which said ball contains three openings, three computers and three monitors, said monitors being held in front of said openings, said computers and said monitors being held by said shelving.

8. The big ball video game console as set forth in claim one in which said game playing device is attached to said ball by a tower, said tower placing said game playing device at a proper angle and height for convenient playing of said video game.

9. A big ball video game console comprising:

a ball, said ball being hollow and having at least one opening therethrough, a base upon which said ball sits, said base holding said ball in a stationary position, internal shelving contained within said ball, said shelving holding at least one computer for a computer based video game and at least one monitor, said monitor being held in front of said opening so said monitor can be viewed therethrough, a game playing device attached to the outside of said ball under said opening, said game playing device used to play said computer based video game contained within said ball, a monetary receiver for game initiation, said monetary receiver being mounted within said ball in such a manner that a face of said monetary receiver, having a slot for insertion of a monetary instrument, is extending through a second opening of said ball, and a ticket dispenser, said ticket dispenser being mounted inside of said ball, with tickets from said ticket dispenser being ejected through a third opening of said ball.

10. The big ball video game console as set forth in claim 9 in which said game playing device is attached to said ball by a tower, said tower placing said game playing device at a proper angle and height for playing and viewing the video game contained within said ball.

11. The big ball video game console as set forth in claim 9 in which said ball further comprises a removable section for access into said ball.

12. The big ball video game console as set forth in claim 11 in which said removable section of said ball is lockable to prevent unauthorized entry into said ball.

13. The big ball video game console as set forth in claim 9 in which said face of said monetary receiver being mounted flush with an outer surface of said ball.

14. A big ball video game console comprising:

shelving, said shelving holding a plurality of computers and a plurality of monitors, each for playing an individual computer based video games, a hollow ball enclosing said shelving, said computers and said monitors, said hollow ball having openings, with each opening corresponding to each one of said monitors, said openings being positioned such that said monitors can be viewed from outside of said ball, a base upon which said hollow ball sits upon to hold said hollow ball in a stationary position, game playing devices attached to the exterior surface of said hollow ball under each of said openings, each of said game playing devices designed for interacting with the computer based game that corresponds to the computer and monitor under which it is located.

15. The big ball video game console as set forth in claim 14 further comprising a monetary receiver for game initiation, said monetary receiver being mounted within said hollow ball in such a manner that a face of said monetary receiver, having a slot for insertion of a monetary instrument, is extending through a second opening of said hollow ball.

16. The big ball video game console as set forth in claim 14 further comprising at least one ticket dispenser, said ticket dispenser being mounted inside of said hollow ball, with tickets from said ticket dispenser being ejected through a third opening of said hollow ball.

* * * * *